(12) United States Patent
Staudenmaier et al.

(10) Patent No.: US 9,811,932 B2
(45) Date of Patent: Nov. 7, 2017

(54) DISPLAY CONTROLLER, HEADS-UP IMAGE DISPLAY SYSTEM AND METHOD THEREOF

(71) Applicant: FREESCALE SEMICONDUCTOR, INC., Austin, TX (US)

(72) Inventors: Michael Andreas Staudenmaier, Munich (DE); Kshitij Bajaj, Sirsa (IN); Chanpreet Singh, S.A.S. Nagar (IN)

(73) Assignee: NXP USA, INC., Austin, TX (US)

( * ) Notice: Subject to any disclaimer, the term of this patent is extended or adjusted under 35 U.S.C. 154(b) by 83 days.

(21) Appl. No.: 14/689,369

(22) Filed: Apr. 17, 2015

(65) Prior Publication Data
US 2016/0307346 A1 Oct. 20, 2016

(51) Int. Cl.
G09G 5/00 (2006.01)
G06T 11/60 (2006.01)
(Continued)

(52) U.S. Cl.
CPC .............. *G06T 11/60* (2013.01); *B60K 35/00* (2013.01); *G02B 27/0101* (2013.01); *G06T 3/0093* (2013.01); *G06T 5/006* (2013.01); *G09G 5/38* (2013.01); *B60K 2350/1096* (2013.01); *B60K 2350/2052* (2013.01); *G02B 2027/013* (2013.01); *G02B 2027/0123* (2013.01); *G02B 2027/0141* (2013.01); *G09G 2340/10* (2013.01); *G09G 2340/12* (2013.01); *G09G 2340/125* (2013.01); *G09G 2358/00* (2013.01); *G09G 2360/02* (2013.01); *G09G 2360/06* (2013.01); *G09G 2380/10* (2013.01)

(58) Field of Classification Search
USPC ........................................................ 345/629
See application file for complete search history.

(56) References Cited

U.S. PATENT DOCUMENTS 5,161,013 A * 11/1992 Rylander ............... G09G 3/002
345/419
5,784,036 A 7/1998 Masahiro et al.
(Continued)

FOREIGN PATENT DOCUMENTS

DE 102004055835 A1 2/2006
DE 102005023818 A1 11/2006
(Continued)

OTHER PUBLICATIONS

Extended European Search Report dated Jul. 29, 2016 in EP Application No. 16164055.2.
(Continued)

*Primary Examiner* — Ryan R Yang

(57) ABSTRACT

The present application relates to a display controller and display system and a method of operating thereof. At a filtering stage display image data are generated on the basis of received pixel-mapped image data. The filtering operation accepts a plurality of pixels out of the received image data as input values to generate a pixel of the display image data as output value. It is further determined whether the plurality of pixels being the input values to the filtering operation are marked. If all pixels thereof are marked, the output pixel being the output value is marked. The marked pixels in the display image data are validated on the basis reference data.

20 Claims, 8 Drawing Sheets

(51) Int. Cl.
*G09G 5/38* (2006.01)
*B60K 35/00* (2006.01)
*G02B 27/01* (2006.01)
*G06T 3/00* (2006.01)
*G06T 5/00* (2006.01)

(56) References Cited

U.S. PATENT DOCUMENTS

| | | |
|---|---|---|
| 6,075,438 A | 6/2000 | Tomofumi et al. |
| 6,597,367 B2 | 7/2003 | Geisler |
| 2008/0049238 A1 | 2/2008 | Nagarajan et al. |
| 2008/0068399 A1 | 3/2008 | Goss et al. |
| 2008/0079753 A1* | 4/2008 | Victor ............ B60Q 9/008 345/660 |
| 2010/0328329 A1 | 12/2010 | Mallet |
| 2011/0057951 A1 | 3/2011 | Bogenberger et al. |
| 2012/0098842 A1 | 4/2012 | Manz et al. |
| 2013/0120437 A1 | 5/2013 | Bajaj et al. |

FOREIGN PATENT DOCUMENTS

| | | |
|---|---|---|
| EP | 0398824 A | 10/1990 |
| EP | 1729256 A | 12/2006 |
| EP | 2439644 B1 | 4/2012 |

OTHER PUBLICATIONS

Non-Final Office Action dated Oct. 17, 2012 for U.S. Appl. No. 12/990,868, 17 pages.
Final Office Action dated Feb. 15, 2013 for U.S. Appl. No. 12/990,868, 12 pages.
Non-Final Office Action dated Aug. 27, 2013 for U.S. Appl. No. 12/990,868, 16 pages.
Final Office Action dated Feb. 26, 2014 for U.S. Appl. No. 12/990,868, 17 pages.
Notice of Allowance dated Feb. 20, 2015 for U.S. Appl. No. 12/990,868, 8 pages.

* cited by examiner

DISPLAY CONTROLLER, HEADS-UP IMAGE DISPLAY SYSTEM AND METHOD THEREOF

FIELD OF THE INVENTION

This invention relates to a display controller, to a heads-up image display system, and a method of operating thereof. In particular, the present application relates to the validation of images including image parts representing safety-relevant information.

BACKGROUND

Vehicle information and entertainment systems and consumer entertainment devices may employ sophisticated graphical schemes. A vehicle information and entertainment system may for instance display both safety relevant, such as the vehicle speed and engine temperature, and non-safety relevant information, such as video or navigation information at the same time. For example, U.S. Pat. No. 5,784,036 discloses a display device for creating a display image in front of a vehicle's windshield. The display device includes a display controller which controls a display to show safety relevant information, such as vehicle speed and not safety relevant information such as audio system control switches, telephone control switches.

However, a disadvantage of this prior art system is that the display controller may generate a wrong image, for example due to a fault in the hardware or software of the display controller, which may result in a dangerous action of the person looking at the display image in front of a vehicle's windshield in case the faulty parts of the display image contain safety relevant information.

SUMMARY

The present invention provides a display controller, a heads-up display system, and a method of operation thereof as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1A:
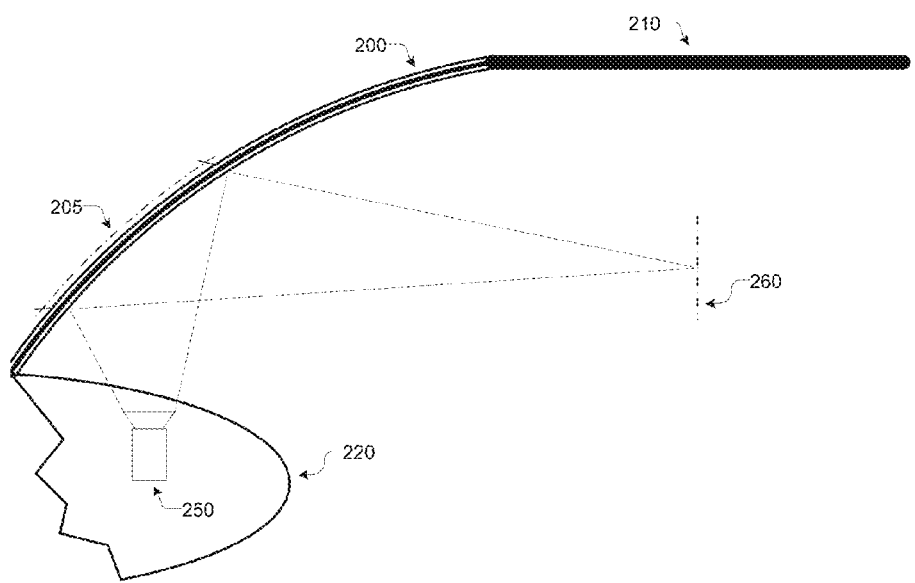
FIGS. 1a and 1b show simplified schematic diagrams illustrating an exemplary application of a heads up display (HUD) system for a vehicle in accordance with one embodiment of the present application.

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Safety relevant or safety related information represents information, an erroneous content of which might be directly responsible for death, injury or occupational illness, or the erroneous content of which may be the basis for decisions relied on, which might cause death, injury, other significant harms or other significant actions. Safety relevant or safety related information may be the output of safety critical application typically operated in a safety critical environment, which is one in which a computer software activity (process, functions, etc.) whose errors, such as inadvertent or unauthorized occurrences, failure to occur when required, erroneous values, or undetected hardware failures can result in a potential hazard, or loss of predictability of system outcome.

FIG. 1a shows a simplified schematic diagram illustrating an exemplary application of a heads up display (HUD) system for a vehicle in accordance with one embodiment of the present application. Heads up display (HUD) system includes an image projector 250, which receives an image for displaying from an image generating controller (not shown) for generating the image projected by the image projector 250. The image generating controller comprises inter alia an image filtering processing module, which is arranged to generate a warped image on a transparent or semi-transparent non-planar, inclined surface plane 24, which is a windshield 200 of a vehicle in one embodiment. In this embodiment, an observer will perceive the image projected on the windshield 200. The image projected on the windshield 200 through the heads up display system is warped such that the observer will perceive the image in a display plane 260 as an image being non-distorted. The heads up display (HUD) system may be built into the instrument board of the vehicle as exemplified in FIG. 1a. The image is projected on a predefined or adjustable area 205 of the windshield 200 through the heads up display system.

Figure 1B:
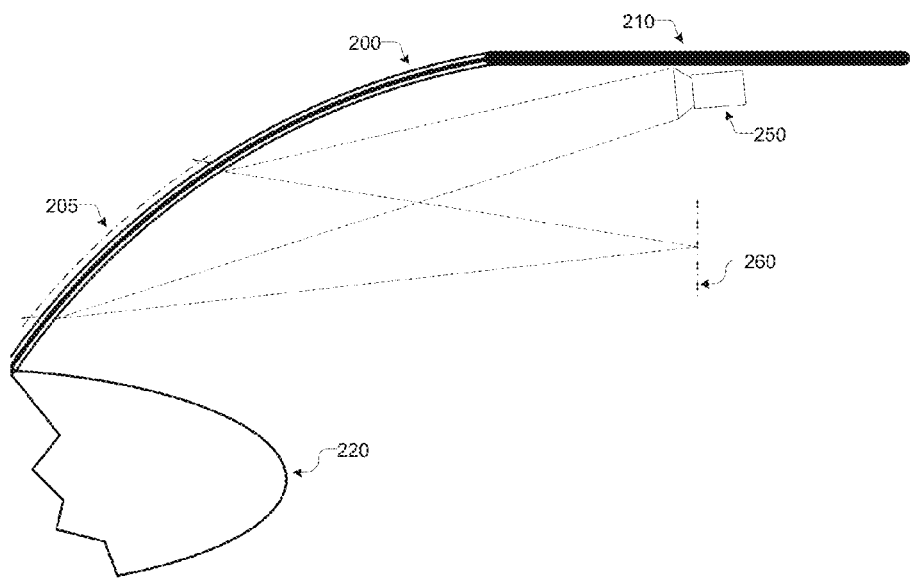

FIG. 1b is a simplified schematic diagram illustrating an alternative example to FIG. 1a. Here, the observer perceives the image again being projected on the surface of the windshield 200. However, the projector 250 of the heads up display system is mounted above and/or behind the observers head at the car's roof interior 210. It should be appreciated that the actual circuitry for the heads up display system may be disposed separate from the image projector 250 in accordance with one example of the invention.

In the above examples, the non-planar surface, on which the image of the head-up display system is projected, is illustrated as a windshield. It will be apparent to one skilled in the art that alternative surfaces may be employed. In one embodiment, a separate transparent or semi-transparent surface may be disposed in the field of view of the observer for projecting the image. Moreover, glasses worn by observer may be used also as such a projecting surface. The image projector 250 may further be located between a driver and a passenger, or configured to direct the image to a location between the driver and the passenger, so that both the driver and passenger can see the resulting warped image.

In order to produce a warped image on a non-planar, inclined surface, a one-time calibration process is performed. This calibration process is performed for each projection, surface, and observer instance (viewer). That is, if the image projector, or image generating device, is changed or moved, or if the surface is changed or moved, or if the observers viewpoint is moved, a new calibration process is required. Data from a plurality of calibration processes may be saved. The saved data may be accessed in response to a change occurring, e.g., for the image projector, the observers viewpoint, etc. The saved calibration data may be accessed to provide a full digital solution of heads-up display system.

As a high-level overview of the calibration process, the following operations are performed: a calibration image is projected normally, onto the warped surface. The calibration image, as projected onto the curved surface, is e.g. digitally photographed from an observers viewpoint. The data of the digital photograph may then be analyzed and processed by software. The results from the processing become input parameter for image warp mapping functionality, which manipulates image data based on the calibration results so that a projected image wrapped according to the calibration data will appear non-distorted, as viewed by an observer. It should be appreciated that the calibration functionality may be incorporated into the HUD system. Alternatively, a calibration module performing the calibration functionality may be a separate module from the HUD system. Moreover, the calibration process may be operated manually by an observer viewing the projected calibration image and adjusting the input parameter for image warp mapping functionality.

Figure 2:
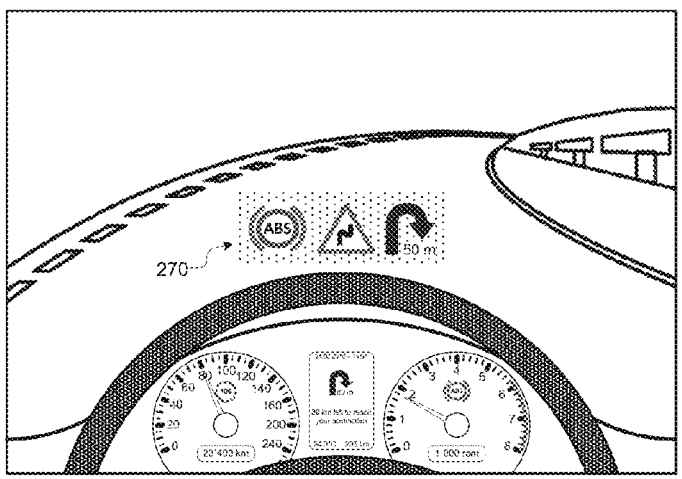
FIG. 2 shows simplified schematic diagram illustrating another exemplary application of a heads up display (HUD) system for a vehicle in accordance with one embodiment of the present application.

FIG. 2 illustrates a driving scene including a graphic representing an exemplary image projected by an image projector of a heads up display system in accordance with the present application. The projected image is illustrated in dewarped representation as experienced by an observer. The projected image comprises dynamically generated information. The information comprises graphical representations of safety relevant or safety critical information and non-safety relevant or informative information. The exemplary HUD image 270 shown in FIG. 2 comprises a composition of graphical symbols selectively displayed in response to vehicle component status (ABS failure warning), street course and navigation instructions.

Safety related or safety critical information may for instance comprise vehicle operating status related information such as engine status related information, power train status related information, vehicle speed, and information about driving conditions including such as speed and outside temperature. Information displayed to a driver by a driver assistance system such as a road sign recognition system, blind spot detection system, and range detecting system may be also considered as safety related information. Non-safety related or informative information may for instance comprise navigation related information, multimedia system related information, traffic related information and the like. Design elements, decorative elements, uniform or non-uniform decorative background images and the like may be also part of the image displayed to an observer and should be considered as non-safety relevant part of the displayed image.

Figure 3A:
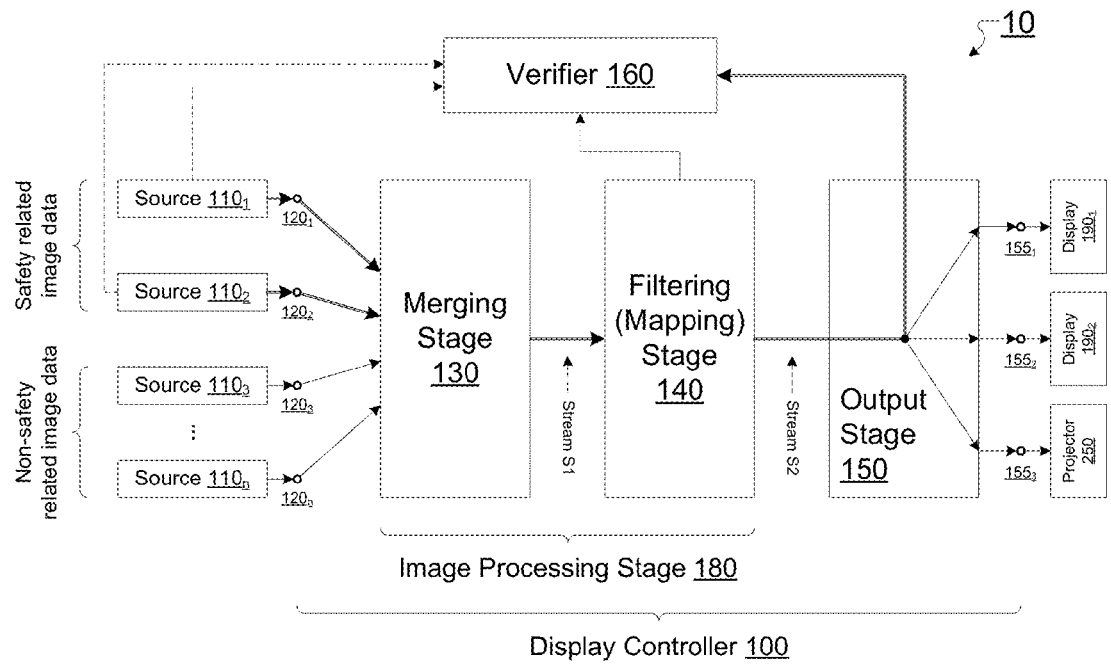
FIG. 3a schematically illustrates a block diagram of a display controller with an image processing stage and an image verifier according to an example of the present invention.

Referring now to FIG. 3a, a schematic block diagram of a display system 10 according to an example of the present application is illustrated. The display system 10 may be a heads up display system as exemplified above. The display system 10 comprises one or more display controllers 100, which accept image data from several image sources 110, composes the received image data into an merged image, generates merged image data on the basis of the composing processing, processes the merged image data and output the processed image data to be displayed, in a for humans perceptible visual form, at a display 190 or an image projector 250. It will be appreciated that the display system 10 may include two or more display controllers 100 and/or provide the data of merged images to two or more displaying components including displays 190 and/or image projectors 250. However, for sake of simplicity, in the example shown in FIG. 3a and described in detail in the following only one display controller 100 and one display 190/image projector 250 are referred to. In the following, the at least one of a display 190 and an image projector 250 will be referred to as displaying component 190, 250 for the sake of readability.

The display controller 100 may include one or more data inputs 120, herein the data inputs $120_j$ j=1, 2, 3, . . . , n for the sake of illustration. At the controller input(s) 120 at least first image data representing one or more safety relevant parts of one or more images to be displayed are received and second image data representing one or more non-safety relevant parts of the one or more images to be displayed are received. For the sake of illustration, the data inputs $120_1$ and $120_2$ are coupled to the sources $110_1$ and $110_2$ which supply the first image data representing the one or more safety relevant parts of one or more images to be displayed. The data inputs $120_3$ to $120_n$ are coupled to the sources $110_3$ to $110_n$ which supply the second image data representing the one or more non-safety relevant parts of one or more images to be displayed.

The display controller 100 generates and outputs one or more images to the displaying component 190, 250 generated on the basis of the first and second image data received at the data inputs $120_j$. A non-safety relevant part of an image to be displayed should be understood to transport an indication or a content relating to non-safety relevant information and safety relevant part of an image to be displayed should be understood to transport an indication or a content relating to safety relevant information.

The first and second image data may be received from any image data generating source $120_j$, which generated the respective image data any manner suitable for the specific implementation. The first image data and the second image data may be generated independent from each other. For example, the generation of a safety relevant part can be implemented in a safety critical environment, for example using full or partial redundant image generating paths in the image data source $120_j$ further coupled redundantly to the display controller 100. Non-safety relevant part may be generated in a less complex environment, thereby reducing the overall complexity of the displaying system.

The first image data and the second image data may comprise pixel image data. The first image data and the second image data may be received in form of one or more streams from the one or more sources 110. The image data received from an image data source may comprise an information indicating whether the image data is first image data representing one or more safety relevant image parts or the image data is second image data representing one or more non-safety relevant image parts. The first image data may be accompanied by an An image data source 110 may comprise or may be coupled to a repository storing a plurality of image data related entries, each of which comprise a predefined image, picture, symbol, icon or graphic representation. Such an image data source retrieves image data from the repository in accordance with e.g. one or more external control signals and outputs the retrieved image data through one of the data inputs 120 to the display controller 100. The image data source may for instance receive a control signal from the engine, the power train, and controllers and/or sensors thereof and generate an image information responsive to the received control signal.

For instance, such repositories may be used to store a set of image data representative of safety-relevant information such as image data iconic or symbolic representations each indicative of a vehicle status information as mentioned above.

Moreover, such repositories may be likewise used to store a set of image data representative of non-safety relevant information such as uniform or non-uniform background images, design image elements, decorative image elements, course guiding symbols and the like. A background image may be also provided by an image source 110 for technical reasons, e.g. to display ensure a substantially transparent background of the image output by the display controller 100 for being projected by an image projector 250 on an at least semi-transparent surface plane.

An image data source 110 may be an image capturing device such as a video camera.

An image data source 110 may be further a multimedia system, a navigation system, a driver assistance system and the like, which may generate an image information on the basis of real-time data and predefined images, pictures, symbols, icons or graphic representations.

The image data source 110 may comprise a graphic processing unit (GPU), which is programmable to generate image data. The image data source 110 may be a storage such as a buffer, which comprises image data for instance organized in a queue.

An image data repository may be part of one or more of the aforementioned image data sources 110.

The display controller 100 comprises an image processing stage 180 including at least one or more image merging stages 130 coupled to the one or more data inputs $120_j$ and an image filtering stage 140, which is coupled to the image merging stages 130.

The merging stage 130 is arranged to compose the first image data and second image data. The composition of the first image data and second image data may be performed by merging, mixing and/or blending the image data. Hence, the merging stage 130 is arranged to generate merged image data on the basis of the first image data and second image data. In the example of FIG. 3a, the image merging stage 130 is shown directly coupled to the data inputs 120. However, those skilled in the art appreciate that the image merging stage 130 may be indirectly connected to the data inputs 120. In the context of the present application, the merging stage 130 should be understood to provide image processing functionality for generating a composite image from image data separately provided to the merging stage 130. Each of the separately provided image data represents a part of the composite image. Each part may be safety relevant or non-safety relevant. The merging stage 130 is arranged to output the composite image in form of pixel-mapped image data, in particular as a pixel-mapped image data stream S1. Each of the pixels in the pixel-mapped image data is marked to indicate whether the pixel is belongs to a safety relevant part in the composite image or to a non-safety relevant part in the composite image.

The image filtering stage 140 is arranged to receive the merged image data from the merging stage 130, to process the merged image data and to output display image data on the basis of the merged image data, on which one or more filtering and/or mapping operations are applied. The image filtering stage 140 is coupled to the merging stage 130 of the image processing stage 180. The image filtering stage 140 will be explained below in detail.

In the context of the present application, the functionality provided by the filtering stage 140 should be understood to comprise any filtering, mapping or transforming image processing operations. In particular, the filtering stage 140 is arranged to apply one or more image filtering, mapping, warping or transforming image processing operations on image data supplied thereto and to generate a filtered, mapped, warped and/or transformed image. More particular, the filtering functionality of the filtering stage 140 according to an example of the present application can be expressed by an algorithms determining each pixel of the filtered image from a plurality of pixels of the input unfiltered image. The image filtering stage 140 is arranged to output the display image data in form of pixel-mapped image data, in particular as a pixel-mapped image data stream S2. Each of the pixels in the pixel-mapped image data is marked to indicate whether the pixel should be considered as being safety relevant and subject of a following validation of the display image data.

The display controller 100 may have one or more data outputs 155 for being coupled to one or more displaying components such as a display 190 or an image projector 250.

In the exemplary display controller 100 illustrated in FIG. 3a, the one or more data outputs 155 are provided by an output stage 150, which distributes the display image data to the one or more displaying components 190, 250. The output stage 150 may comprise a signal converter (not shown), which generates display signals on the basis of display image data, which are required by the respective displaying components 190, 250 without changing or modifying image represented by the display image data. The display signals may be analog and/or digital display signals. The output stage 150 may comprise one or more signal amplifiers (not shown), which are arranged to amplify the one or more display signals to be supplied to the respective displaying components 190, 250. The output stage 150 may comprise generators (not shown) for additional timing signals required by the one or more displaying components 190, 250 such as Hsync, VSync, DE (display enable) or alike. The output stage 150 may comprise a 1-to-n multiplexer (not shown) for distributing the display signal to n displaying components 190, 250.

In the following the filtered image data output by the filtering stage 140 will be denoted as display image data. The display image data may not be further modified by any subsequent components, through which the display image data is passed.

One or more verifiers or monitoring stages 160 are connected to receive the display image data generated by the image processing stage 180 of the display image controller 100. The one or more verifier stages 160 may be coupled to the output of the filtering stage 140 or the data transmission medium carrying the display image data output by the filtering stage 140, as exemplarily illustrated the verifier stage 160. A verifier stage 160 is coupled to the image output stage 140, which is arranged to provide display signals on the basis of the display image data for being displayed by one or more displaying components 190, 250. The verifier stage 160 is arranged to validate the one or more safety relevant parts of the image as represented to an observer by a displaying component 190, 250 to ensure that the one or more parts corresponding of the safety relevant parts of the first image data are present and completely and correctly included in the image as presented to the observer. The verifier 160 validates the content of the displayed image on the basis of the display image data in order to ensure that safety relevant information is displayed as intended. The functionality and exemplary implementations of a verifier stage 160 will be described below in detail.

Figure 3B:
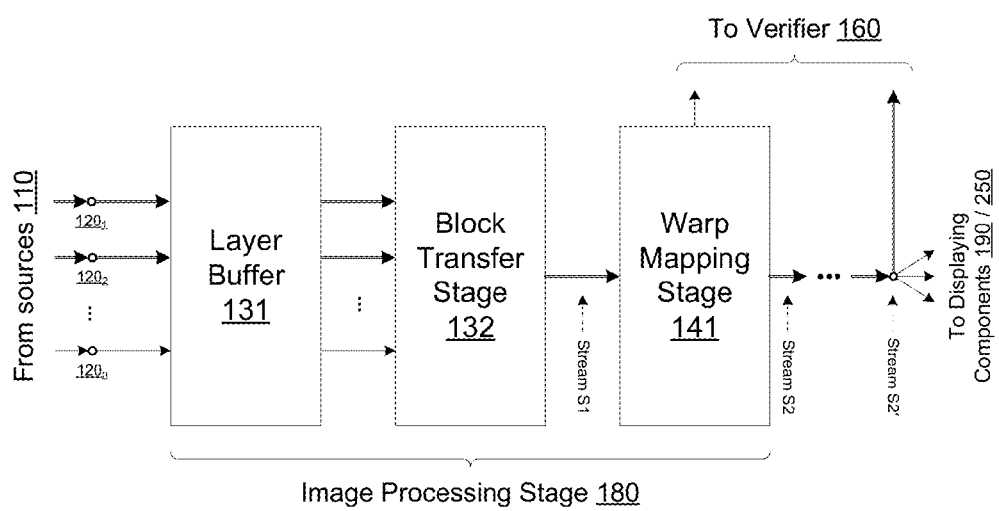
FIG. 3b schematically illustrates a block diagram of a further exemplary implementation of the image processing stage according to an example of the present invention.

Referring now to FIG. 3b, a further exemplary implementation of the image processing stage 180 is schematically illustrated. The exemplary image processing stage 180 comprises a layer buffer 131, a bit block transfer stage 132 and a warp mapping stage 141. The layer buffer 131 and the bit block transfer stage 132 embody an exemplary implementation of the merging stage 130. The warp mapping stage 141 embodies an exemplary implementation of the image filtering stage 140.

For example, the merged image may be obtained from a set of different image layers. The set of different image layers may be arranged in a stack of layers, which are merged or blended to form the merged image. Each of the layer comprises the image data provided or supplied by one of the image data sources 110 to the display controller 100. The image to be displayed may be obtained by composing first layer data included in the first image data and second layer data included in the second image data.

The first layer data relating to one or more safety relevant parts of the image to be displayed comprises one or more first layers and the second layer data relating to the non-safety relevant part of the image to be displayed comprises one or more second layers. Each image data of each layer is received from a respective one of the sources 110 at a respective one of the data inputs 120. As exemplified in FIG. 3a, data relating to one first layer of the first image data is received from the source $110_1$ coupled to the data input $120_1$ and data relating to another one first layer of the first image data is received from the source $110_2$ coupled to the data input $120_2$. Data relating to one second layer of the second image data is received from the source $110_3$ coupled to the data input $120_3$ and data relating to another one second layer of the second image data is received from the source $110_n$ coupled to the data input $120_n$.

The bit block transfer stage 132 is arranged to operate as a merging stage 130 and to merge the one or more first layers and the one or more second layers into one image to be displayed by generating the merged imaged data representing to image to be displayed obtained by merging the first and second layers. It should be understood that the image data of the layers may be generated independent from each other and for example the imaged data of each layer comprises pixel-mapped image data having the same dimensions as the merged image. The layers may be superimposed on each other or otherwise be formed into a stack which is then merged to obtain the merged image. The layer buffer 131 is provided in the display controller 100 to buffer the layers received from the image data sources 110 and to provide the image data relating to each buffered layer for being retrieved by the bit block transfer stage 132, which performed the merging or blending of the stack of layers. The bit block transfer stage 132 is arranged to transfer data of the layers using a raster operation, which logically combines the pixels of the layers at the same location in image space.

Figure 4A:
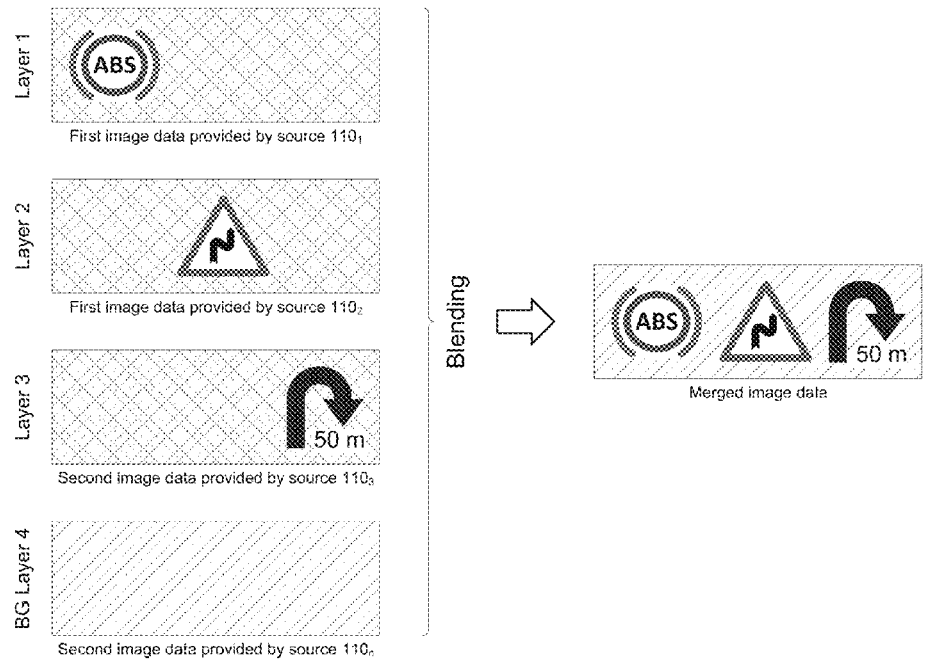
FIG. 4a schematically illustrates an image merging operation performed by an image merging stage of a display controller according to an example of the present invention.

Referring now to FIG. 4a, the merging of a stack of illustrative layers is schematically shown in the basis of the exemplary heads-up display image of FIG. 2. The exemplified stack of layers comprises first layers identified as layer 1 and layer 2. The layer 1 and layer 2 comprises first image data relating to safety relevant parts of the image to be displayed. The layer 1 exemplifies image data of a warning symbol indicative of a failure of the antilock braking system of a vehicle and the layer 2 exemplified image data of a symbol of a danger sign indicative of a double or S-curve output by a road sign recognition system. The image data comprised in the layer 1 and the layer 2 are considered to be safety relevant. Accordingly, the layer 1 and the layer 2 are top layers in the stack of layers.

The layer 3 and the background (BG) layer 4 comprises second image data relating to non-safety relevant parts of the image to be displayed. The layer 3 exemplifies image data of a guiding symbol output by a navigation system. The background (BG) layer 4 may for instance comprise a real-time generated infrared image of the field of view of a driver of a vehicle augmenting the view of the driver through the windshield. The image data comprised in the layer 3 and the BG layer 4 are considered to be non-safety relevant. Accordingly, the layer 3 and the BG layer 4 are arranged below the top layers to prevent from obscuring safety relevant parts comprised in the top layers arranged above them.

The merging stage 130 is arranged to merge the layers of the stack taking into account a stack level associated with the layers associated with a level of safety. The merging stage 130 may be arranged to mix the layers of the stack on the basis of transparency information embedded in the image data or provided in addition to the image data of the layers.

The merging stage 130 may apply alpha blending to merge the layers into one merged image.

Referring now back to FIG. 3b, the merging stage 130 may support one or more safety modes, in which the safety relevant parts in the first layers are protected from being obscured by non-safety relevant parts in the second layers. The one or more first layers may for example be arranged as top layers of the stack of layers. For example, the first layers may contain safety relevant parts only and be the top layers, which, by default, are superimposed on the other second layers when merging the stack of layers. The merging stage 130 may be configured to always maintain the safety relevant parts of the top layers, for example by overwriting for parts marked as non-transparent each and every layer arranged below the top layers. Accordingly, the information in the safety relevant part will always be visible and accordingly safety may be enhanced as it is assured that the non-safety relevant part do not interfere with the safety relevant part.

The merging stage 130 outputs the merged image data to the filtering stage 140 which may comprise a warp mapping stage 141 as shown in the example of FIG. 3b. The merging stage 130 may output a pixel-mapped data stream S1 of the merged image, which is supplied to the filtering stage 140.

The filtering stage 140 further comprises one or more filtering stages for filtering image processing operation including e.g. the warp mapping stage 141. The filtering stage 140 is arrange to determine a value of an output pixel on the basis of the values of several input pixels and further in accordance with one or more predefined filtering parameters.

Figure 5:
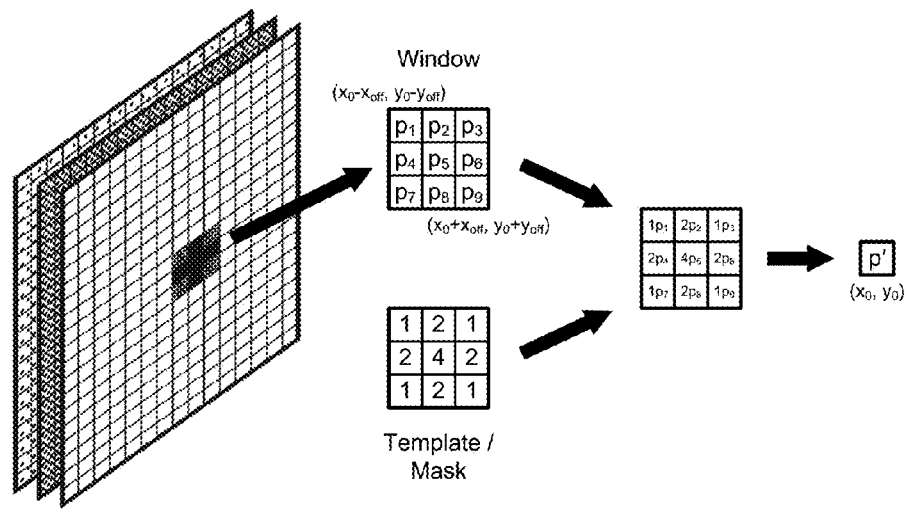
FIG. 5 schematically illustrates a filtering operation performed on image data according to an example of the present invention.

Referring now to FIG. 5, an exemplary filtering image processing operation accepting several input pixel values and one or more predefined filtering parameters to generate a single output pixel value is schematically illustrated for the sake of more fully understanding of the present application. The filtering image processing operation are known in the field of image editing using sliding windows to select the input pixel values to a filtering operation. The sliding window is defined with respect to a location in the image space, herein the pixel at the location $(x_0, y_0)$, and a predefined width and height, herein $\pm x_{off}$ and $\pm y_{off}$, respectively, to identify the input pixel values to a filtering image processing, which outputs a resulting pixel value p' for the location $(x_0, y_0)$, which pixel value is a function of the input pixel values in the sliding window, herein the pixel values $p_0$ to $p_9$ corresponding to the rectangular two-dimensional range defined by the locations $(x_0-x_{off}, y_0-y_{off})$ and $(x_0+x_{off}, y_0+y_{off})$, wherein $x_{off}, y_{off}=1$, and further parameters. The further parameters may comprise a template or mask applied to the pixel values of the sliding window. As exemplified in with reference to FIG. 5, the template may define scaling values, each for being applied to one of the pixel values in the sliding window. The output pixel value p' for the location $(x_0, y_0)$ is finally determined from the scaled pixel values defined by the sliding window and the template.

The present application should not be understood to be limited to filtering image processing operations using sliding windows technique. The filtering stage 140 should be understood to be also arranged for image warp mapping, which distorts shapes in an image in accordance with a predefined transform. Image warp mapping substantially means that pixels of plane of an input image are mapped to pixels of a plane of an output image. In the context of the present application, image warp mapping should not be understood to be limited to warping of pixels without changing the pixel values. On contrary, the image warp mapping should be understood to include any perspective transform operations, which determine a pixel value at a location in the warped output image on the basis of several pixels at various locations in the input image. In particular, the display controller 100 according to an example of the present application includes an image warp mapping stage 141, which is arranged to generate a warped image to be displayed on a curved surface on the basis of the merged image data. The image warp mapping stage 141 in particular arranged to generate a warped image to be displayed on a curved windshield surface by a heads-up display system such that the observer perceives an undistorted image. The warp mapping operations is parametrized according to settings and configurations of the heads-up display system to ensure the experience of an undistorted image by the observer. The settings and configurations may take into account the individual one or two-dimensional curvature of the windshield, the dimensions of the image to be displayed to the view and/or the view plane/viewpoint in which the observer is positioned.

An example of a perspective warp mapping will be illustrated below with reference to FIG. 8 for the sake of a more fully understanding of teaching of the present application.

Referring now back to FIG. 3b, the filtered image data output by warp mapping stage 141 is supplied as display image data to the output stage 150, which interfaces the display controller 100 to the one or more displaying components 190, 250. Indeed the filtered image data output by the filtering stage 140 represented the display image data representing the image displayed by the displaying components 190, 250.

As already aforementioned, the display controller 100 comprises one or more verifiers or monitoring stages 160, which are provided to validate the image data finally output by the display controller to the one or more displaying components 190, 250. For the sake of illustration, the display controller 100 is exemplified with one verifier stage 160 for the sake of explanation, which should not be understood to be limiting the present invention.

The image validation operation performed by the verifier stage 160 allows to check that the one or more parts representative of the safety relevant parts corresponding to the first image data are present and completely and correctly included in the image as presented to an observer. Hence, the verifier stage 160 operates on the final display image data output to a viewer by at least one of the displaying components 190, 250.

In order to allow for validation of one or more parts representative of the safety relevant parts in the image represented by the display image data, which have been subjected to one or more filtering operations, the display controller 100 receives marking data in conjunction with at least the first image data. The marking data is provided by the respective image data source and identifies the safety relevant parts in the first image data supplied by the respective image data source. The marking data may be embedded in the first image data or may be provided separately with the first image data, in particular a marking information may be associated with each pixel of the first image data provided by an image data source.

Figure 4B:
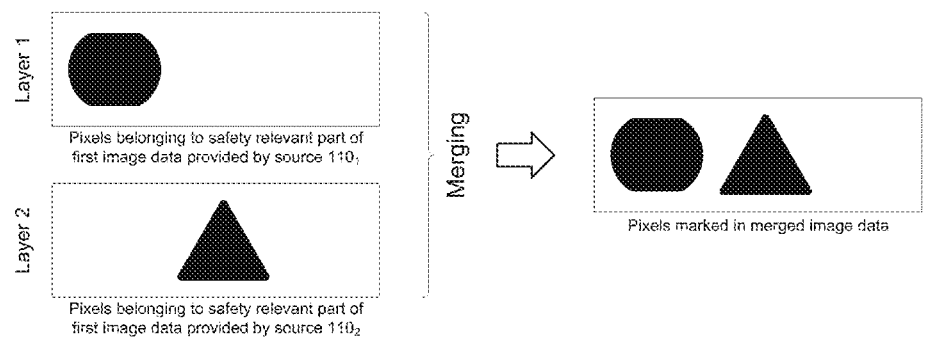
FIG. 4b schematically illustrates a generation of an image marking operation for identifying safety relevant parts in merged image data according to an example of the present invention.

Referring to FIG. 4b, the marking of the safety relevant parts is exemplified with respect to the layer merging in accordance with an example of the present application exemplified above. Each data image source providing layers including safety relevant parts may additionally provide marking data, which identifies the safety relevant parts in the layers. The layers including safety relevant parts may be identified from originating image data source 110. In response to receiving image data from a respective image data source 110 providing first image data, the layer including the first image data is handled to comprise safety relevant image parts. FIG. 4b schematically illustrates left hand side depictions highlighting the pixels belonging to the safety relevant parts comprised in the aforementioned exemplary layer 1 and layer 2.

The merging stage 130 is adapted to generate marking data, which identifies the safety relevant parts in the merged image data. The marking data may be understood as a masking pattern data, on the basis of which each pixel of the safety relevant parts in a pixel-mapped merged image data is identified. FIG. 4b schematically illustrates a right hand side depiction highlighting the pixels belonging to the safety relevant parts comprised in the merged image data. The safety relevant parts comprised in the merged image data correspond to the safety relevant parts of the first image data. The marking data may comprise a 1-bit information associated with each pixel in the merged image data to indicate whether the respective pixel belongs to a safety relevant part or not.

The merging stage 130 in particular supplies the merged image data and the merged marking data in form of one or more data streams to the filtering stage 140 of the display controller 100 for being processing thereat. The marking data is processed at the filtering stage 140 to enable the verifier stage 160 to validate the finally generated image data for safety purpose.

Each pixel may be understood as a triple value representing red, green, and blue color portion values (RGB) or as a triple value representing a Lumina value and two Chroma values (YCrCb). For coding marking data relating to one pixel, one bit is sufficient. The pixel-mapped merged image data including marking data may be coded on the basis of 3*depth+1 Bits, wherein depth defines the number of bits for each of triple value. For instance, a pixel may be coded as an RGB-coded with 8 Bit per color (color depth) resulting to 3*8 Bits=24 Bits for color coding. Hence, each pixel of the merged image comprises 25 Bits (equal to 3*8 Bits+1 Bit). Those skilled in the art understand the other color depths may be used such as a color depth of 16 Bits resulting to 48 Bits for coding the color information per pixel or a color depth of 5 Bits for the red and blue components and a color depth of 6 Bits for the green component resulting to 16 Bits for coding the color information per pixel. Further, a marking bit equal to 1 may indicate that the pixel belongs to a safety relevant part in the merged image.

Alternatively, the marking data may be embedded in the pixel values of the first layers including first image data representing one or more safety relevant parts. For instance, a least significant bit of a pixel may be used to code the marking data. Using a least significant bit of a pixel for coding the associated marking data may limit the color space and/or brightness levels of the merged image but without deteriorating the perceived quality of the image to be displayed as experienced by an observer. Those skilled in the art understand that such marking data embedded in the pixel values may be maintained in the layer merging operation resulting in merged image data with embedded marking data identifying the safety relevant parts in the merged image.

Figure 6:
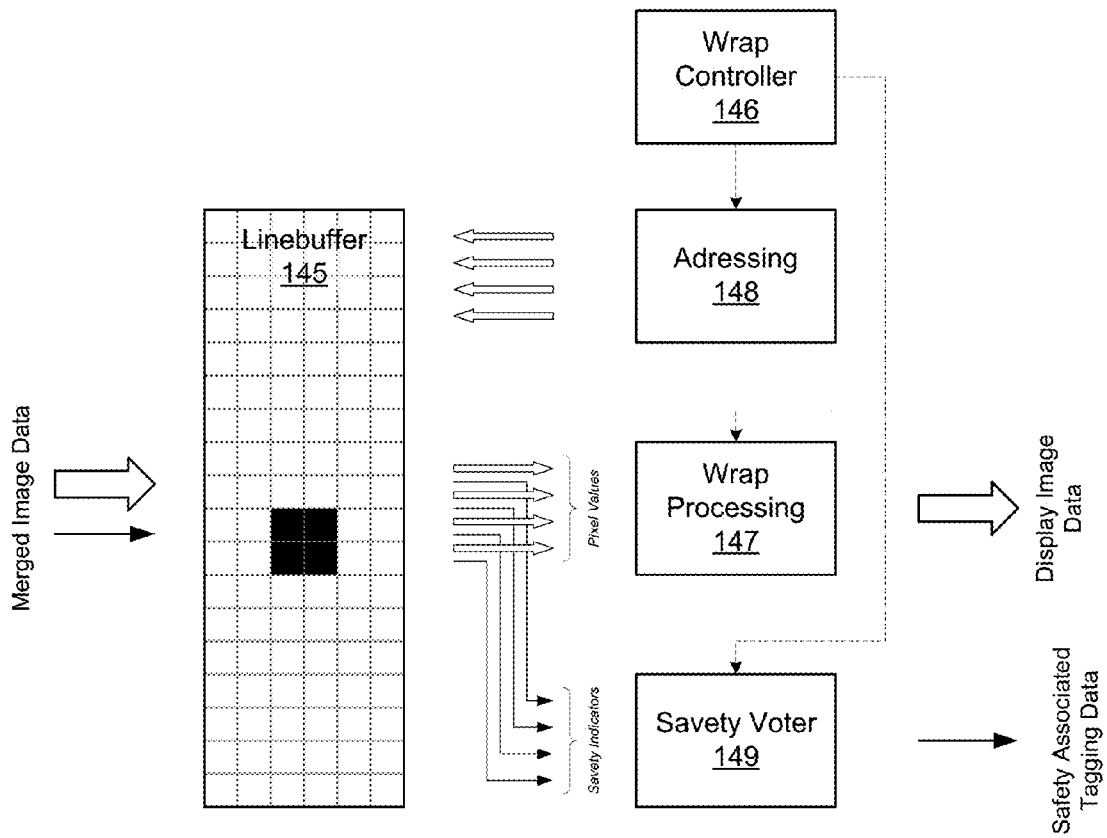
FIG. 6 schematically illustrates a block diagram of a filtering stage including a safety voter of the display controller according to an example of the present invention.

Referring now to FIG. 6, the operation of the filtering stage 140 will be further exemplified with respect to an exemplary warp mapping stage 141 as illustrated in FIG. 3b and described with reference thereto. The warp mapping stage exemplified in FIG. 6 comprises a buffer 145, which is provided to buffer at least a part of the merged image data and the merged marking data received from the merging stage 130. The buffer 145 may be a line buffer, which is arranged to buffer a defined number of pixel values of the merged image data and the marking data associated with the pixel values. The buffer 145 may provide three memory locations for each pixel. The buffer 145 may provide a fourth memory location for each pixel to buffer the marking data associated with each pixel. The marking data may comprise a 1-bit information associated with each pixel. Alternatively, the marking data may be embedded in the pixel value in particular as described above.

The warp mapping stage of FIG. 6 further comprises a warp controller portion 146, a warp processing portion 147, an addressing portion 148 and a safety voter portion 149. The warp controller portion 146 is coupled to the addressing portion 148, which addresses a plurality of pixel values. The addressed plurality of pixel values are supplied as input values to the warp processing portion 147, which is arranged to determine an output pixel value from the plurality of input pixel values in accordance with a respective warp mapping operation.

In parallel or subsequently to the warp mapping operation, the safety voter portion 149 receives the marking data associated with the addressed plurality of pixel values. On the basis of the provided marking data, the safety voter portion 149 is arranged to decide whether all pixel values of the addressed plurality of pixel values are marked as belonging to a safety relevant part of the merged image. If the all pixel values of the addressed plurality of pixel values are marked as belonging to a safety relevant part of the merged image, then the output pixel value generated by the warp processing portion 147 is marked as being safety relevant. Otherwise, if one or more pixel values of the addressed plurality of pixel values are not marked as safety relevant, which means that the one or more pixel values of the addressed plurality of pixel values belong to a non-safety relevant part of the merged image, then the output pixel value generated by the warp processing portion 147 is not marked or remains unmarked indicating that the output pixel value is non-safety relevant.

The safety voter portion 149 is arranged to generate marking data, which identifies the pixel values in the mapped image data, which have been determined only on the basis of pixel values of the merged image data belonging to one or more safety relevant parts in the merged image.

The operation and functionality of the safety voter portion 149 will be further described with reference to FIGS. 7a, 7b, 7c, 8a and 8b.

Figure 7A:
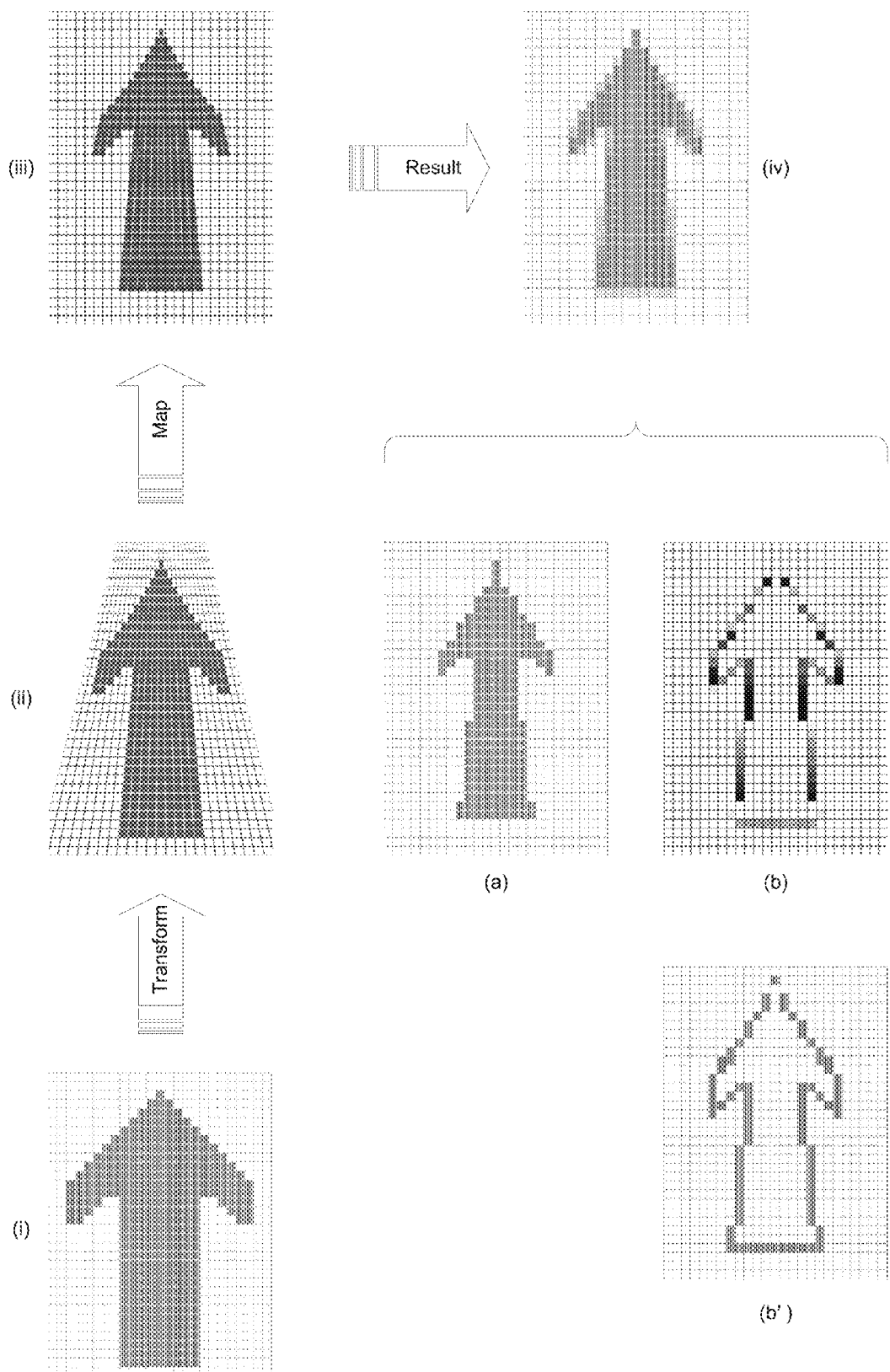
FIG. 7a schematically illustrates a perspective warping of an exemplary arrow symbol and the operation of a safety voter of the display controller according to an example of the present invention.

Referring now to FIG. 7a, perspective warping of an exemplary arrow symbol and the operation of a safety voter of the display controller according to an example of the present invention is schematically illustrated.

For the sake of explanation, a perspective warp mapping of an arrow symbol by applying a trapezoid mapping operation is illustrated with respect to the depictions (i) and (ii). Each grid element may be understood as a pixel. Hence, the depiction (i) illustrates a bit map comprising 25×35 (width×height) pixel. The effect of the trapezoid mapping operation is immediately understood from the depiction (ii) and the distorted grid shown in the background of the arrow symbol. The distorted arrow symbol as illustratively shown in the depiction (ii) is mapped to a bit map as illustratively shown in the depiction (iii). The depiction (vi) illustrates the result obtained from the trapezoid mapping operation when applied to the 25×35 pixel bit map with the arrow symbol as shown in depiction (i).

For the sake of understanding, the back colored grid elements represent the pixel values of the arrow symbol and should be considered as being marked as safety relevant. The empty of white colored grid elements may be considered as belonging to the background and should be considered as being non-safety relevant.

As understood from the depiction (iv) of FIG. 7a, the edge region of the distorted arrow symbol is determined from pixel values belonging to the arrow symbol and pixel values belonging to the background.

The depiction (a) of FIG. 7a illustrates the pixels of the distorted arrow symbol, which have been determined on the basis of pixel values of the undistorted arrow symbol only, whereas the depiction (b) of FIG. 7a illustrates the pixels of the distorted arrow symbol, which have been determined on the basis of pixel values of the undistorted arrow symbol and the background. The depiction (b) of FIG. 7a illustrates the edge region of the distorted arrow symbol, which have been assigned grey scale values depending on the contribution of the pixel values of the undistorted arrow symbol and the background in accordance with the mapping of the perspectively warped arrow symbol mapped onto the 25×35 pixel bit map. For the sake of better recognizability, the edge region of the distorted arrow symbol comprising pixel with different grey scaled pixel values are shown in depiction (b') of FIG. 7a.

Figure 7B:
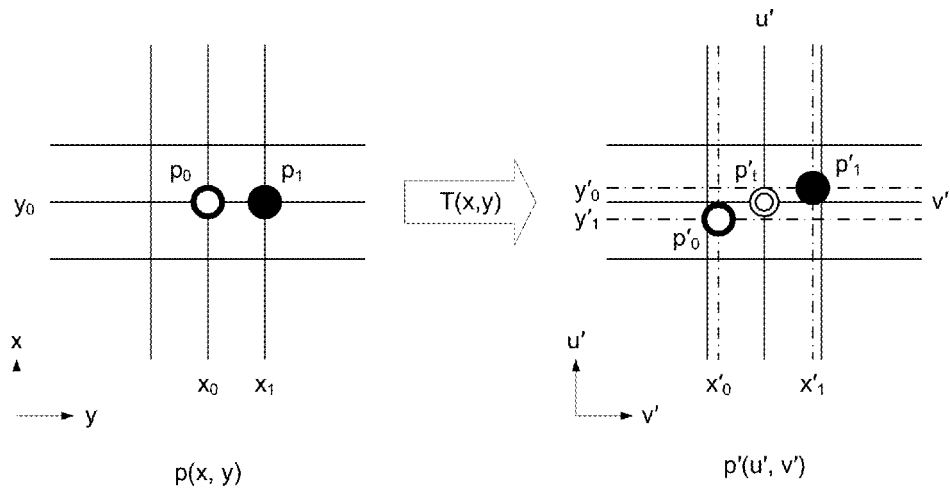
FIG. 7b schematically illustrates a perspective warping operation according to an example of the present invention.

With reference to FIGS. 7a and 7b, warp mapping operations according to examples of the present invention will be further described.

With reference to FIG. 7b, a forward warp mapping operation is schematically illustrated. The pixels $p(x, y)$ of a source image represented by the input image data to the warp mapping operation are assigned to integer value coordinates. For the sake of explanation, two pixels of the source image are illustrated, a first source pixel $p_0$ having the coordinate $(x_0, y_0)$ and a second source pixel $p_1$ having the coordinate $(x_1, y_0)$. The warp mapping transformation $(x', y')=T(x, y)$ (e.g. $x'=T_x(x, y)$ and $y'=T_y(x, y)$, respectively) maps the coordinates of the pixels of the source image to coordinates in the target image space. In the space of the target image, all pixels $p'_t$ thereof are assigned to integer value coordinates. For the sake of explanation, the coordinate $(x_0, y_0)$ of the first source pixel $p_0$ is mapped to the target coordinate $T(x_0, y_0)=(x'_0, y'_1)$ and the coordinates $(x_1, y_0)$ of the second pixel $p_1$ are mapped to the target coordinates $T(x_1, y_0)=(x'_1, y'_0)$. The target coordinates $(x'_0, y'_1)$ and $(x'_1, y'_0)$ may be integer or non-integer value coordinates in accordance with the forward warp mapping operation $T(x, y)$. If a target coordinate $(x', y')=T(x, y)$ is an integer value coordinate, then the pixel value of the source pixel $p(x, y)$ is applied to the target pixel $p'_t(u', v')=p'(x', y')$. However, the target coordinate may be non-integer value such as illustrated in FIG. 7b; herein the target coordinate $(x'_0, y'_1)$ of the first mapped pixel $p'_0$ is non-integer value and the target coordinate $(x'_1, y'_0)$ of the first mapped pixel $p'_1$ is non-integer value for the sake of illustration. This means that the pixel values of the first and second source pixels $p_0$ and $p_1$ may not be directly applied to respective target pixels in the target image. In order to determine the pixel values of the pixels $p'_t$ in the target image, the pixel values (colors values) of the mapped pixels p' with non-integer value coordinates are distributed on pixels of the target image. For instance, the target pixel $p'_t(u', v')$ is determined from pixel value contributions (color value contributions) of neighboring mapped pixels including the first and second mapped pixels $p'_0$ and $p'_1$.

For marking the pixels of the target image, it is determined whether all source pixels, which contribute to a target pixel $p'_t(u', v')$, are determined on the basis of source image pixels $p(x, y)$ marked as belonging to a safety relevant part, then the target pixel $p'_t(u', v')$ is marked as safety relevant. Otherwise, the target pixel $p'_t(u', v')$ is not marked. This means that at least one of the mapped pixels, which contribute to a target pixel $p'_t(u', v')$, is determined on the basis of a source image pixel $p(x, y)$ not marked as belonging to a safety relevant part.

For instance, it should be assumed that the first and second mapped pixels $p'_0$ and $p'_1$ have non-integer value target coordinates $(x'_0, y'_1)$ and $(x'_1, y'_0)$ as illustrated in FIG. 7b. The first and second mapped pixels $p'_0$ and $p'_1$ neighboring pixels to the target pixel $p'_t(u', v')$ with the integer value pixel coordinate $(u', v')$ contribute to the pixel value of the target pixel $p'_t(u', v')$. In case that the corresponding first and second source pixels $p_0$ and $p_1$ are marked as belonging to a safety relevant part, then the target pixel $p'_t(u', v')$ is marked as safety relevant. In case that only the second source pixels $p_1$ is marked, then the target pixel $p'_t(u', v')$ is not marked as safety relevant.

Figure 7C:
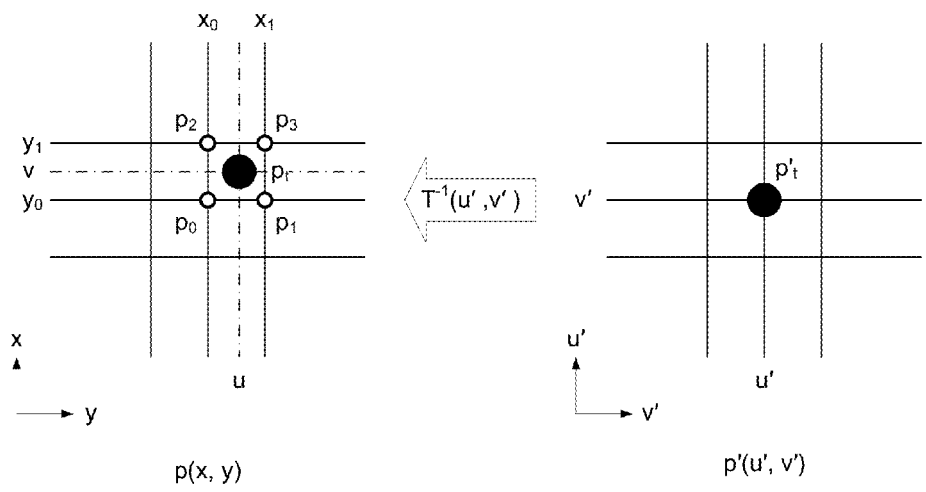
FIG. 7c schematically illustrates another perspective warping operation according to an example of the present invention.

With reference to FIG. 7c, an inverse warp mapping operation is schematically illustrated. The target image is represented by target pixels $p'_t(u', v')$. The target pixels $p'_t(u', v')$ from the output data of the inverse warp mapping operation. Each target pixel $p'_t(u', v')$ has a integer value coordinate $(u', v')$. For each target pixel $p'_t(u', v')$, a corresponding mapped source coordinate $(u, v)$ is determined by applying an inverse warp mapping transformation $(u, v)=v'$) (e.g. $u=T_u(u', v')$ and $v=T_v(u', v')$, respectively), which maps the coordinates of the pixels of the target image to coordinates in the source image space. In the space of the source image, all pixels p thereof are assigned to integer value coordinates. For the sake of explanation, the coordinate $(u', v')$ of the target pixel $p'_t$ is mapped to the source coordinate $T^{-1}(u', v')=(u, v)$. The source coordinate $(u', v')$ may be an integer or non-integer value coordinate in accordance with the inverse warp mapping operation $T^{-1}(u', v')$. If a source coordinate $(u, v)=v'$) is an integer value coordinate, then the pixel value of the source pixel $p(u, v)$ is applied to the target pixel $p'_t(u', v')=p'(u', v')$. However, the source coordinate may be non-integer value such as illustrated in FIG. 7c; herein the source coordinate $(u, v)$ of the mapped pixel $p_t$ is non-integer value for the sake of illustration. This means that the pixel value of the source pixel $p_t$ may not be directly applied to a respective target pixel $p'_t$ in the target image. In order to determine the pixel value of the target image, the pixel value of the neighboring source pixels p are considered for instance in that the pixel value of the pixel $p_t(u, v)$ is determined by interpolation on the basis of the neighboring source pixels $p_0$ to $p_3$ with integer value coordinates. For instance, the pixel value of the inverse mapped pixel $p_t(u, v)$ may be determined by interpolating on the basis of the pixel values of the source pixels $p_0(x_0, y_0)$, $y_0$), $p_0(x_0, y_1)$, and $p_3(x_1, y_1)$, wherein the coordinates $(x_0, y_0)$ to $y_1$) are integer value coordinates in the source image space. In particular, nearest neighbor, bilinear, Gaussian or bicubic interpolation may be used to determine the pixel value of the pixel $p_t$ with the non-integer source coordinate $(v, u)$ in the source image space.

For marking the pixels of the target image, it is determined whether all source pixels, which contribute to an inverse mapped pixel $p_t(u, v)$, are determined on the basis of source image pixels $p(x, y)$ marked as belonging to a safety relevant part, then the target pixel $p'_t(u', v')$ is marked as safety relevant. Otherwise, the target pixel $p'_t(u', v')$ is not marked. This means that inverse mapped pixel $p_r(u, v)$, which value represents the pixel value of the target pixel $p'_r(u', v')$, is determined on the basis of at least one source image pixel $p(x, y)$ not marked as belonging to a safety relevant part.

For instance, it should be assumed that the pixel value of the inverse mapped pixel $p_r(u, v)$ is determined by an interpolation using the pixel values of the source pixels $p_0(x_0, y_0)$, $p_1(x_1, y_0)$, $p_2(x_0, y_1)$, and $p_3(x_1, y_1)$, which are all marked as belonging to a safety relevant part. In this case, the target pixel $p'_r(u', v')$ is marked as safety relevant. Otherwise, if for instance source pixels $p_0(x_0, y_0)$ is not marked as belonging to a safety relevant part (or any one or more of the further source pixels $p_1(x_1, y_0)$, $p_2(x_0, y_1)$, and $p_3(x_1, y_1)$), the target pixel $p'_r(u', v')$ is not marked as safety relevant Referring now to FIGS. 8*a*, 8*b* and 8*c*, the operation of a safety voter of the display controller according to an example of the present invention is illustrated with respect to a filtering operation using sliding window with a template comprising weighting values.

Figure 8A:
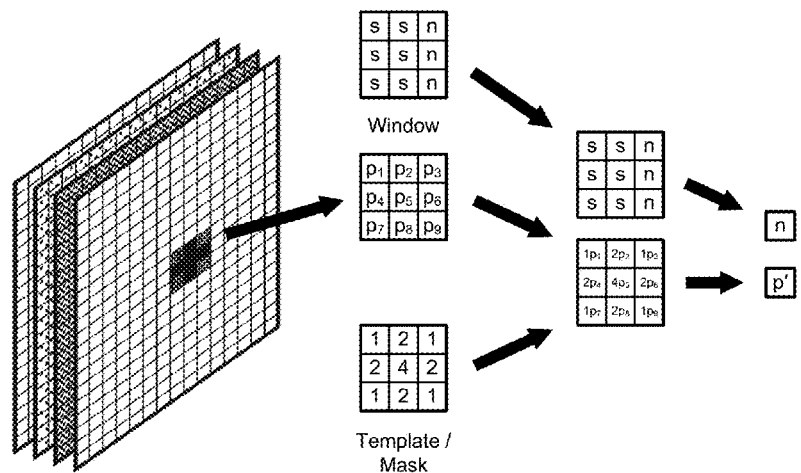
FIGS. 8a, 8b, and 8c schematically illustrate the operation of a safety voter of the display controller according to an example of the present invention.

With reference to FIG. 8*a*, four planes are illustrated, which should be understood to schematically illustrate a buffer such as a line, which stores a number of pixels of an image and marking data. Each pixel comprises a triple value coding a color and brightness. One bi-value marking value of the marking data is associated with each pixel. The bi-value marking value is indicative of the associated pixel belonging to a safety relevant part or not. For the sake of illustration, the marking data comprises a number of values equal to the number of pixels. Moreover, a bi-value marking value may have one of the values "s" indicative of safety relevant and "n" indicative of non-safety relevant for the sake of explanation.

Further with reference to FIG. 8*a*, the pixel values $p_1$ to $p_9$ should be assumed as input pixel values to the exemplary filtering operation. The input pixel values $p_1$ to $p_9$ may be weighted according to the exemplary template and the output pixel value $p'$ results from the exemplary filtering operation.

In addition to the filtering operation, it is determined whether the input pixel values to the filtering operation all belong to one or more safety relevant parts of the image. This is determined on the basis of the marking values associated with the input pixel values $p_1$ to $p_9$. For the sake of explanation, it is assumed with respect to FIG. 8*a* that the input pixel values $p_1$, $p_2$, $p_4$, $p_5$, $p_7$ and $p_8$ belong to one or more safety relevant parts, whereas the input pixel values $p_3$, $p_6$ and $p_9$ do not belong to a safety relevant part. Accordingly, the output pixel resulting from the exemplary filtering operation is marked as non-safety relevant as shown in FIG. 8*a*.

Figure 8B:
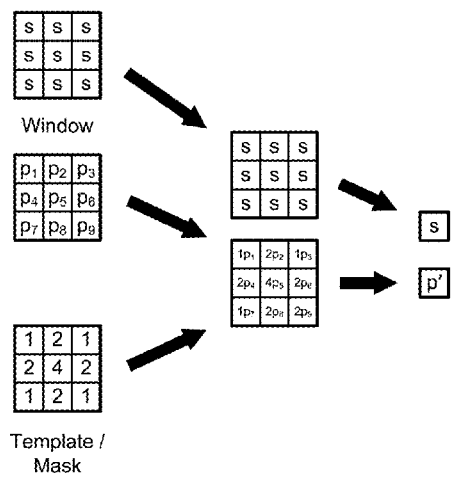

Further with reference to FIG. 8*b*, the pixel values $p_1$ to $p_9$ should be also assumed as input pixel values to the exemplary filtering operation. The input pixel values $p_1$ to $p_9$ may be also weighted according to the exemplary template and the output pixel value $p'$ results from the exemplary filtering operation. For the sake of explanation it is assumed with respect to FIG. 8*a* that all the input pixel values $p_1$ to $p_9$ belong to one or more safety relevant parts. Accordingly, the output pixel resulting from the exemplary filtering operation is marked as safety relevant as shown in FIG. 8*b*.

Figure 8C:
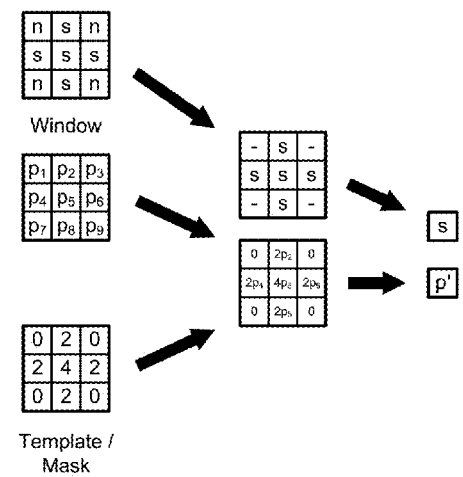

The weighting template may be considered when determining whether the output pixel resulting from the exemplary filtering operation is to be considered as safety relevant or not. As exemplified with respect to FIG. 8*c*, the input pixel values $p_2$, $p_4$, $p_6$, $p_6$ and $p_8$ belong to one or more safety relevant parts, whereas the input pixel values $p_1$, $p_3$, $p_7$ and $p_9$ do not belong to a safety relevant part. However, only the pixel values $p_2$, $p_4$, $p_5$, $p_6$ and $p_8$ are input pixel values to the exemplary filtering operation as defined by the weighting template. Accordingly, the output pixel resulting from the exemplary filtering operation is marked as safety relevant as shown in FIG. 8*c*.

Figure 9A:
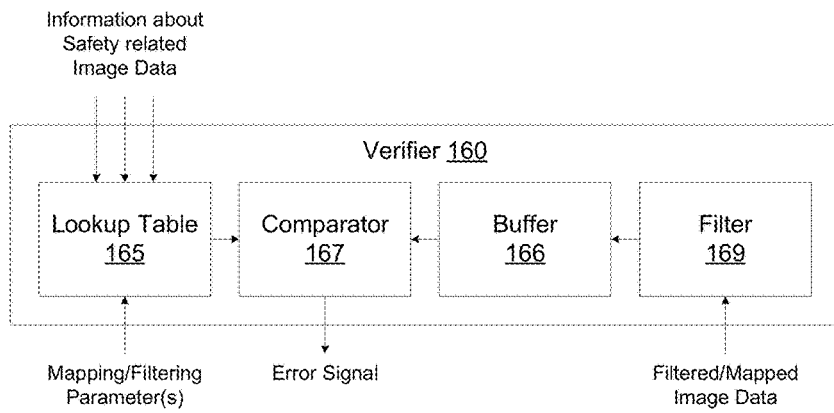
FIG. 9a schematically illustrates a block diagram of an exemplary implementation of the image verifier according to an example of the present invention.

Referring now to FIG. 9*a*, a block diagram of a verifier stage 160 of the display controller 100 according to an example of the present invention is schematically illustrated. The verifier stage 160 comprises a filter 169, a buffer 166, a lookup table 165 and a comparator 167.

The buffer 167 receives the display image data to be displayed as illustrated in FIGS. 3*a* and 3*b*. In particular, the buffer 167 is coupled to the output of the filtering stage 140 of the display controller 100. More particularly, the buffer 166 receives the marked display image data output by the filtering stage 140. The marked display image data comprises the display image data, which is marked by the safety voter portion 149 of the filtering stage 140 as being safety relevant. The filter 169 may be arranged between the filtering stage 140 and the buffer 166 for filtering the marked display image data out of the display image data. The marked display image data represent one or more safety relevant parts in the display image data. The represent one or more safety relevant parts in the display image data are based on the first image data representative of the one or more safety relevant parts in the form as provided by the one or more image data sources $120_j$.

The lookup table 165 comprises a set of reference image data records. Each record of the set reference image data records is associated with a safety related part and further associated with a specified filtering operation. The specified filtering operation comprises a specific filtering operation and/or a specific parametrization thereof. On the basis of information about the safety related part and information about the filtering operation applied to obtain the display image data to be display, a record comprising reference image data is retrievable from the lookup table 165. The information about the safety related part may be provided by the respective image data source 110, which also provides the image data relating to the one or more safety relevant parts, to the verifier stage 160. The information about the filtering operation may be provided by the filtering stage 140 of the display controller 100 or may be predefined.

The reference image data may be pre-calculated and/or the reference image data may be calculated at a safety reliable system for instance each time the filtering operation applied to obtain the display image data to be displayed is newly set or newly parametrized. With reference to the heads-up display system use case, the filtering operation may be newly set or may be newly parametrized once the warping of the image projected by the image projector 250 of the heads-up display system 200 is adjusted to the surface shape or curvature of the windshield or the positioning of the plane of view of the observer.

The comparator 167 compares the reference image data with the marked display image data to validate the one or more safety relevant parts in the display image data to be displayed. In case the reference image data and the marked display image data mismatch, the comparator 167 generates an error signal indicative of the detected mismatch.

Figure 9B:
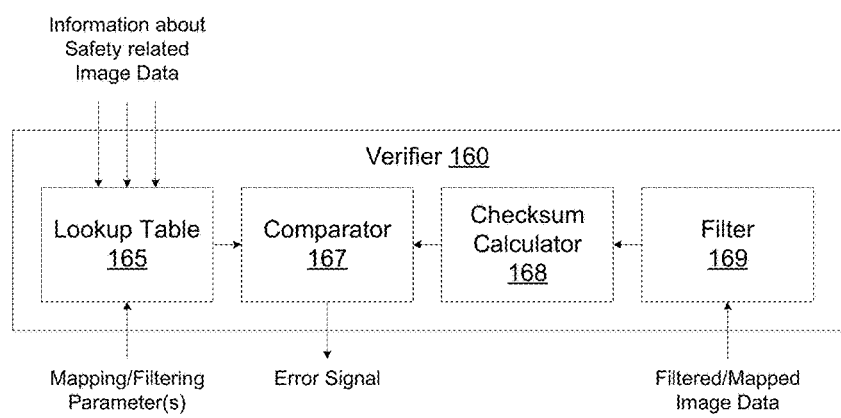
FIG. 9b schematically illustrates a block diagram of another exemplary implementation of the image verifier according to an example of the present invention.

Referring now to FIG. 9*b*, a block diagram of a verifier stage 160 of the display controller 100 according to another example of the present invention is schematically illustrated. The verifier stage 160 comprises a checksum calculator 168, a lookup table 165 and a comparator 167.

The checksum calculator 168 receives the display image data to be displayed as illustrated in FIGS. 3a and 3b. In particular, the checksum calculator 168 is coupled to the output of the filtering stage 140 of the display controller 100. More particularly, the checksum comparator 168 receives the marked display image data output by the filtering stage 140. The checksum calculator 168 is arranged to determine a checksum on the basis of the marked display image data received thereat. The filter 169 may be arranged between the filtering stage 140 and the checksum calculator 168 for filtering the marked display image data out of the display image data.

The display image represented by the display image data may comprise one, two or more simply connected areas defined marked pixels. Each simply connected area corresponds to one of the one or more safety relevant part represented by the first image data. A checksum may be calculated for each simply connected area.

The checksum calculator 168 is in particular arranged to calculate one or more checksums on the basis of the pixel values and/or the locations (pixel coordinates) of the pixels in the display image data, which are marked as being safety relevant. A checksum calculated on the basis of pixel values and locations or marked pixels belonging to a safety-relevant part allows to validate that that the image representation of the safety-relevant part is present in the display image data, is visible to an observer, has the intended graphical content and is disposed at an intended location in the display image.

For calculating the checksum at least one of a checksum algorithm hash algorithm, fingerprint algorithm, randomization algorithm, hash algorithm including non-cryptographic and cryptographic hash algorithm, cyclic redundancy check algorithm or any other checksum algorithm may be used. Various algorithms are available in the state of the art.

From the above description, those skilled in the art understand that a checksum on the basis of pixels and/or their locations for a graphical representation in the display image representing a safety relevant part depends on the filtering operation applied to the image data at the filtering stage 140 of the display controller 100. Hence, the checksum can be considered as a function of a specific safety relevant part in the first image data, a location of the specific safety relevant part in the display image, a specific filtering operation including the filtering algorithm applied and the filtering parameter used.

The checksum may be pre-calculated based on information about the specific safety relevant part, the display location thereof in the display image and information about the filtering operation. In an exemplary application case, the set of safety relevant parts, which may be selectively displayed, the filtering operation applied thereto and possible filtering parameter are known in advance. On the basis of this knowledge, a set of checksums may be pre-calculated and stored in a checksum storage. During operation of the display controller 100, one or more checksum may be retrieved from the checksum storage on the basis of information e.g. provided by one or more image data sources 110 and the filtering stage 140.

The lookup table 165 comprises a set of reference checksum records. Each record of the set reference checksum records is associated with a safety related part and further associated with a specified filtering operation. On the basis of information about the safety related part and information about the filtering operation applied to obtain the display image data to be display, a record comprising reference checksum is retrievable from the lookup table 165.

The reference checksum may be pre-calculated and/or the reference checksum may be calculated at a safety reliable system for instance each time the filtering operation applied to obtain the display image data to be displayed is newly set or newly parametrized.

The comparator 167 compares the reference checksum with the generated checksum to validate the one or more safety relevant parts in the display image data to be displayed. In case the reference checksum and the generated checksum mismatch, the comparator 167 generates an error signal indicative of the detected mismatch.

According to an example of the present application, a display controller 100 is provided. The display controller 100 comprises a filtering stage 140 and a verifier stage 160 coupled to the filtering stage 140.

The filtering stage 140 is arranged to receive image data representative of an image comprising at least one safety relevant image part and one or more non-safety relevant image parts. The received image data is a pixel-mapped image data. The pixels belonging to the at least one safety relevant image data are marked. The filtering stage 140 is further arranged to operate a filtering operation to generate display image data on the basis of the received image data. The filtering operation is arranged to accept a plurality of pixels out of the received image data as input values to generate a pixel of the display image data as output value. The filtering stage 140 is further arranged to determine whether the plurality of pixels being the input values to the filtering operation are marked and if all pixels thereof are marked to mark the pixel being the output value. The verifier stage 160 is arranged to validate the pixels being marked in the display image data on the basis reference data.

According to an example of the present application, the display controller 100 further comprises at least one data input $120_1$ to $120_n$ and a merging stage 130 coupled to the at least one data input 120. At the at least one data input $120_1$ to $120_n$ first image data representing the at least one safety relevant image part and to receive second image data representing the one or more non-safety relevant image parts are received. The merging stage 130 receives the first image data and the second image data at the at least one data input $120_1$ to $120_n$ and is arranged to compose the first image data and the second image data to form merged image data to be provided to the filtering stage 140. The merged image data is pixel mapped image data. The pixels belonging to the at least one safety relevant part in the merged image data are marked.

According to an example of the present application, each pixel in the image data comprises a color information and marking information indicative of a marking of the respective pixel. The color information may comprise three color values relating to read, green and blue color portions. The color information may likewise comprise two color values relating to blue-difference and red-difference chroma components and a luminance value.

According to an example of the present application, the display controller 100 further comprises a comparator portion 167, which is arranged to compare marked pixels in the received image data representing display image data with the reference data. The comparator portion 167 validates the display image data with respect to the at least one safety relevant image part included therein.

According to an example of the present application, the checksum calculator 168 is arranged to determine the checksum on the basis of at least one of pixel values of the marked pixels and locations of the marked pixels in the image space.

According to an example of the present application, verifier stage (160) further comprises at least one image data input to receive the display image data; at least one parameter input to receive at least one of information about the at least one safety relevant image part and information about the filtering operation applied to generate the display image data; and a set of reference data. Each reference data is associated with a specific safety relevant image part and a specific filtering operation applied to generate the display image data. The verifier stage 160 is further arranged to select the reference data for validation from the set of reference data on the basis of the received information According to an example of the present application, the verifier stage 160 further comprises a reference table 165, which is arranged to store a set of reference data records. Each record is associated with a specified safety relevant part and a specified filtering operation.

According to an example of the present application, the filtering stage (140) further comprises a warp mapping stage 141. The warp mapping stage 141 is arranged to operate a warp mapping operation to generate display image data on the basis of the received image data. The display image data is warped to be displayed on a non-planar surface in such a way that an observer of the displayed image comprised by the display image data perceives the image as being undistorted.

According to an example of the present application, the warp mapping stage 141 is configurable to adjust the warp mapping operation to generate warped image data for being projected on non-planar surfaces with differing curvatures and/or observed by the observer at differing viewing distances and angles.

According to an example of the present application, the filtering stage 140 further comprises a safety voter portion 149, which is arranged to generate marking data for the display image data on the basis of marking data of the received image data. The marking data is indicative of pixels belonging to the at least one safety relevant image part in the display image data.

According to an example of the present application, the display controller 100 further comprises at least one first data input $120_1$, $120_2$ to receive the first image data from at least one first image data source $110_1$, $110_2$; and at least one second data input $120_3$, $120_n$ to receive the second image data from at least one second image data source $110_3$, $110_n$.

According to an example of the present application, a display system 10 is provided, which comprises a displaying component 190, 250 and a display controller coupled to the displaying component 190, 250. The displaying component 190, 250 is provided for displaying an image representative of the display image data to an observer. The display controller is arranged to supply the display image data to the displaying component 190, 250. The display controller is a display controller according to an example of the present application.

According to an example of the present application, the display system is a heads-up display system, which comprises an image projector 250 coupled to the display controller 100. The image projector 250 is arranged to project the image representative of the display image data on a surface into the line of sight of the observer. According to an example of the present application, the surface is at least semi-transparent. In particular, the surface is non-flat and more particularly curved.

According to an example of the present application, a method of operating a display controller 100 is provided. Image data comprising at least one safety relevant image part and one or more non-safety relevant parts is received. The receive image data is pixel-mapped image data. The pixels belonging to the safety relevant data are marked. A filtering operation is performed on the received image data. The filtering operation accepts a plurality of pixels out of the received image data as input values to generate an output pixel of the display image data as output value. Display image data is generated on the basis of the output pixels. It is determined whether the plurality of pixels being the input values to the filtering operation are marked. If all pixels thereof are marked then the output pixel is marked in the display image data. The marked pixels in the display image data are validated on the basis reference data.

According to an example of the present application, the display controller is a display controller according to an example of the present application.

According to an example of the present application, first image data representing the at least one safety relevant image part is received and second image data representing a non-safety relevant image part is received. The first image data and the second image data is composed to form merged image data to be provided for filtering. The merged image data is pixel mapped image data. The pixels belonging to the at least one safety relevant image part in the merged image data are marked.

According to an example of the present application, a checksum is determined on the basis of marked pixels in the display image data and the checksum is validated against the reference data.

According to an example of the present application, the filtering operation further comprises performing a warp mapping operation on the received image data to generate the display image data. The display image data is warped to be displayed on a non-planar surface in such a way that an observer of the displayed image perceives the image as being undistorted.

According to an example of the present application, marking data for the display image data is generated on the basis of marking data of the received image data.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A display controller, comprising:
   a filter stage to receive an input image layer comprising a plurality of input image pixels, and to provide a plurality of output image pixels based on the plurality of input image pixels, wherein:
      each pixel of the plurality of input image pixels includes marking information indicating safety relevant or non-safety relevant;
      each pixel of the plurality of output image pixels includes marking information indicating safety relevant or non-safety relevant;
      a particular output image pixel of the plurality of output image pixels is based on a group of more than one of the plurality of input image pixels; and
      the marking information of the particular output image pixel is set by the filter stage to indicate safety relevant in response to all of the pixels of the group being marked as safety relevant; and
   a verifier stage, coupled to the filter stage, to validate the plurality of output image pixels based on the marking information of an output image pixel indicating that the output image pixel is safety relevant, and based on reference data.

2. The display controller of claim 1, further comprising:
   at least one data input to receive first image data representing a safety relevant image part and to receive second image data representing a non-safety relevant image part;
   a merging stage coupled to the at least one data input to receive the first image data and the second image data and arranged to compose the first image data and the second image data to form the plurality of input image pixels to be provided to the filter stage,
   wherein pixels belonging to the first image data in the plurality of input image pixels include marking information indicating safety relevant.

3. The display controller of claim 1,
   wherein the each pixel of the plurality of input image pixels comprises a color information.

4. The display controller of claim 1, wherein the verifier stage includes:
   a comparator portion arranged to compare marked pixels in the plurality of output image pixels with the reference data to validate the plurality of output image pixels with respect to the safety relevant image part included therein.

5. The display controller of claim 1, wherein the verifier stage includes:
   a checksum calculator arranged to determine a checksum from marked pixels in the plurality of output image pixels, wherein the checksum is validated against the reference data.

6. The display controller of claim 5,
   wherein the checksum calculator is further arranged to determine the checksum on the basis of at least one of pixel values of the marked pixels and locations of the marked pixels in an image space.

7. The display controller of claim 5, wherein the verifier stage further includes:
   at least one image data input to receive the plurality of output image pixels;
   at least one parameter input to receive at least one of information about the safety relevant image part and information about the filtering operation applied to generate the plurality of output image pixels; and a set of reference data, wherein each reference data is associated with a specific safety relevant image part and a specific filtering operation applied to generate the plurality of output image pixels, wherein the verifier stage is further arranged to select the reference data for validation from the set of reference data on the basis of the received information.

8. The display controller of claim 1, wherein the verifier stage includes:

a reference table arranged to store a set of reference data records, wherein each record is associated with a specified safety relevant part and a specified filtering operation.

9. The display controller of claim 1, wherein the filter stage includes:

a warp mapping stage arranged to operate a warp mapping operation to generate the plurality of output image pixels on the basis of the received plurality of input image pixels, wherein a display image composed by the plurality of output image pixels is warped to be displayed on a non-planar surface in such a way that an observer of the displayed image perceives the image as being undistorted.

10. The display controller of claim 9, wherein the warp mapping stage is configurable to adjust the warp mapping operation to generate warped image data for being projected on non-planar surfaces with differing curvatures and/or observed by the observer at differing viewing distances and angles.

11. The display controller of claim 1, wherein the filter stage includes:

a safety voter portion arranged to generate marking data for the plurality of output image pixels on the basis of marking data of the received plurality of input image pixels.

12. The display controller of claim 1, further comprising:

a first data input to receive first image data representing a safety relevant image part from at least one image data source; and a second data input to receive second image data representing a non-safety relevant image part from at least one image data source.

13. The display controller of claim 1, further comprising:

a display system, including:

a displaying component, coupled to the filter stage, for displaying an image representative of the plurality of output image pixels to an observer;

wherein the filter stage is arranged to supply the display image data to the displaying component.

14. The display controller of claim 13, wherein the display system is a heads-up display system, and wherein the displaying component is an image projector for projecting the image representative of the plurality of output image pixels on a surface into the line of sight of the observer.

15. The display controller of claim 1, further comprising:

a merge stage to receive source image data from a plurality of image sources, to generate a merged image based on the source image data and to provide the merged image to the filter stage as the input image layer.

16. A method of operating a display controller, said method comprising:

receiving an input image layer comprising a plurality of input image pixels comprising a safety relevant image part and a non-safety relevant image part, wherein the each pixel of the plurality of input image pixels includes marking information indicating safety relevant or non-safety relevant;

performing a filtering operation on the received plurality of input image pixels, wherein the filtering operation provides a plurality of output image pixels based on the plurality of input image pixels;

each pixel of the plurality of output image pixels includes marking information indicating safety relevant or non-safety relevant;

a particular output image pixel of the plurality of output image pixels is based on a group of more than one of the plurality of input image pixels; and the marking information of the particular output image pixel is set by the filtering operation to indicate safety relevant in response to all of the pixels of the group being marked as safety relevant;

generating display image data on the basis of the plurality of output image pixels; and validating the plurality of output image pixels based on the marking information of an output image pixel indicating that the output image pixel is safety relevant, and based on a basis reference data.

17. The method according to claim 16, receiving first image data representing the safety relevant image part;

receiving second image data representing the non-safety relevant image part; and composing the first image data and the second image data to form the plurality of input image pixels to be provided for filtering.

18. The method according to claim 16, further comprising:

determining a checksum on the basis of the plurality of output image pixels; and validating the checksum against the basis reference data.

19. The method according to claim 16, wherein the filtering operation further comprises:

performing a warp mapping operation on the plurality of input image pixels to generate the plurality of output image pixels, wherein a display image composed by the plurality of output image pixels is warped to be displayed on a non-planar surface in such a way that an observer of the displayed image perceives the image as being undistorted.

20. The method of claim 16, further comprising:

receiving source image data from a plurality of image sources;

generating a merged image based on the source image data; and providing the merged image as the input image layer.

* * * * *